United States Patent
DaSilva et al.

(10) Patent No.: US 12,335,590 B2
(45) Date of Patent: Jun. 17, 2025

(54) LENS MOUNT CALIBRATION MECHANISM FOR LARGE CAMERA

(71) Applicant: Sphere Entertainment Group, LLC, New York, NY (US)

(72) Inventors: Deanan DaSilva, Malibu, CA (US); Michael Graae, Brooklyn, NY (US); Bryan Guenther, Tucson, AZ (US); John Michael Eric Mongelli, Tucson, AZ (US); Timothy John Bierman, Windsor, WI (US); Logan Andrew McDermot, Marshall, WI (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

(21) Appl. No.: 18/734,215

(22) Filed: Jun. 5, 2024

(65) Prior Publication Data

US 2024/0323508 A1   Sep. 26, 2024

Related U.S. Application Data

(63) Continuation of application No. 17/887,307, filed on Aug. 12, 2022, now Pat. No. 12,058,430.

(51) Int. Cl.
*H04N 23/55* (2023.01)
*H04N 23/53* (2023.01)
*H04N 23/57* (2023.01)

(52) U.S. Cl.
CPC .............. *H04N 23/55* (2023.01); *H04N 23/53* (2023.01); *H04N 23/57* (2023.01)

(58) Field of Classification Search
CPC ........ H04N 23/50; H04N 23/51; H04N 23/54; H04N 23/55; G02B 7/003–005;
(Continued)

(56) References Cited

U.S. PATENT DOCUMENTS 7,405,760 B2   7/2008   Cho et al.
7,440,200 B2   10/2008   Kuroki et al.
(Continued)

FOREIGN PATENT DOCUMENTS

CN        116261023 A        6/2023
DE   102019216808 A1 *   5/2021
(Continued)

OTHER PUBLICATIONS

International Search Report and Written Opinion directed to related International Application No. PCT/US2023/074930, mailed Apr. 23, 2024; 12 pages.

*Primary Examiner* — Anthony J Daniels
(74) *Attorney, Agent, or Firm* — Sterne, Kessler, Goldstein & Fox P.L.L.C.

(57) ABSTRACT

Disclosed herein are system, apparatus, and method for accurately setting a focus flange depth and planarity of a camera lens. An aspect includes a lens housing with at least one camera lens, a camera body with an imaging plane, and a lens mount removably coupling the lens housing to the camera body via a coupling mechanism. At least one shim may be inserted between the lens mount and the camera body to adjust a depth, pitch, and yaw of the camera lens in the lens housing with respect to the imaging plane in the camera body. Each shim may comprise a body having an opening extending from an edge of the body to a center of the body. The opening of each shim is configured to receive the coupling mechanism such that the pitch and yaw may be adjusted without fully removing the lens housing from the camera body.

20 Claims, 13 Drawing Sheets

(58) Field of Classification Search
CPC .. G02B 7/022; G02B 7/023; G02B 7/04–105;
G03B 17/12; G03B 17/14
USPC ........................................................ 348/376
See application file for complete search history.

(56) References Cited

U.S. PATENT DOCUMENTS

| | | | |
|---|---|---|---|
| 11,159,707 | B2 | 10/2021 | Endo et al. |
| 2011/0189808 | A1 | 8/2011 | Watanabe |
| 2012/0113276 | A1 | 5/2012 | Van Arendonk et al. |
| 2013/0222685 | A1 | 8/2013 | Topliss et al. |
| 2017/0104022 | A1 | 4/2017 | Okamura et al. |
| 2017/0146766 | A1 | 5/2017 | Hsu et al. |
| 2017/0208227 | A1 | 7/2017 | Tsuchida et al. |
| 2017/0214830 | A1 | 7/2017 | Tang et al. |
| 2017/0353637 | A1* | 12/2017 | Campbell .............. H04N 23/51 |
| 2018/0084647 | A1 | 3/2018 | Nalla et al. |
| 2018/0114804 | A1 | 4/2018 | Hsieh |
| 2019/0174087 | A1 | 6/2019 | Kim et al. |
| 2019/0364192 | A1* | 11/2019 | Wang .................... H04N 23/55 |
| 2020/0336633 | A1 | 10/2020 | Sesti et al. |
| 2021/0074750 | A1 | 3/2021 | Gu et al. |
| 2022/0006929 | A1 | 1/2022 | Li et al. |
| 2024/0056665 | A1 | 2/2024 | DaSilva et al. |
| 2024/0064394 | A1 | 2/2024 | Shin et al. |
| 2024/0107141 | A1 | 3/2024 | Jo et al. |

FOREIGN PATENT DOCUMENTS

| | | | |
|---|---|---|---|
| JP | 2006203706 A | | 8/2006 |
| JP | 2010011040 A | | 1/2010 |
| WO | WO 2022/145954 A1 | | 7/2022 |

\* cited by examiner

LENS MOUNT CALIBRATION MECHANISM FOR LARGE CAMERA

CROSS-REFERENCE TO RELATED APPLICATIONS

The present application is a continuation of U.S. patent application Ser. No. 17/887,307, filed Aug. 12, 2022, which is incorporated herein by reference in its entirety.

TECHNICAL FIELD

The present disclosure relates to a camera system having an external mechanism for accurately setting a focus flange depth and/or a focus flange planarity of a camera lens mount system. Specifically, the external mechanism is configured to calibrate a depth, a pitch, and a yaw of at least one camera lens with respect to an imaging plane in a camera body.

BACKGROUND

A camera is a device used to capture and record real-life images in the form of photographs and/or videos. In order to capture and record such images, cameras generally comprise a camera body and a camera lens. The camera lens passes light reflected from objects in the real world and focuses the light onto an imaging plane in the camera body that captures the focused light as an image. The image may then be used to generate a photograph or a frame in a high quality video stream. The camera body may also include processors to execute computer-readable instructions that control various operations of the camera and a memory storage to save the captured images. Some cameras may receive power from an external power source (e.g., via a wire connection to a power outlet) while other cameras may receive power from an internal power source (e.g., a built-in or attachable battery pack). Various components of the camera must be adjusted and/or improved over time in order to keep up with the constantly evolving demand for higher resolution photographs, higher quality videos, larger display screens, faster streaming speed, and so on.

BRIEF SUMMARY

Disclosed herein are system, apparatus, device, method and/or computer program product embodiments, and/or combinations and sub-combinations thereof for an external mechanism that accurately sets the focus flange depth and planarity of a camera's lens mount system. The external mechanism is configured to calibrate a depth, a pitch, and a yaw of at least one camera lens with respect to an imaging plane in a camera body.

In some embodiments, a system for accurately setting a focus flange depth and/or a focus flange planarity of a camera lens includes, among other things, a lens housing having a distal end, at least one camera lens positioned within the lens housing, a camera body having a front face and an imaging plane within the camera body, and a lens mount removably coupling the distal end of the lens housing to the front face of the camera body via at least one coupling mechanism. At least one shim is configured to adjust at least one of a depth, a pitch, and a yaw of the at least one camera lens in the lens housing with respect to the imaging plane in the camera body. Each shim includes, among other things, a body having at least one opening extending from an edge of the body to a center of the body. The at least one opening is configured to receive the at least one coupling mechanism.

In another embodiment, an apparatus for accurately setting a focus flange depth and/or a focus flange planarity of a camera lens includes, among other things, a body having an opening extending from an edge of the body to a center of the body. The opening is configured to receive a coupling mechanism coupling a distal end of a lens housing to a front face of a camera body. The body is configured to create a gap between the camera body and the lens housing to adjust at least one of a depth, a pitch, and a yaw of the camera lens positioned in the lens housing with respect to an imaging plane in the camera body.

In yet another embodiment, a method for accurately setting a focus flange depth and/or a focus flange planarity of a camera lens includes, among other things, partially loosening at least one coupling mechanism attaching a lens mount to a front face of a camera body, inserting a number of shims between the lens mount and the front face of the camera body, and adjusting the number of shims inserted between the lens mount and the front face of the camera body. The method partially loosens the at least one coupling mechanism such that the at least one coupling mechanism maintains contact with both the lens mount and the camera body while creating a gap between the camera body and the lens mount. The method inserts the number of shims such that an opening of at least one shim receives the at least one coupling mechanism. The method adjusts the number of shims inserted between the lens mount and the front face of the camera body to change at least one of a depth, a pitch, and a yaw of the camera lens positioned within a lens housing that is removably coupled to the camera body via the lens mount.

In some examples, the method adjusts the number of shims inserted along a y-axis of the camera body to adjust the pitch of the camera lens in the lens housing with respect to an imaging plane in the camera body.

In some examples, the method adjusts the number of shims inserted along an x-axis of the camera body to adjust the yaw of the camera lens in the lens housing with respect to an imaging plane in the camera body.

Descriptions provided in the summary section represent only examples of the embodiments. Other embodiments in the disclosure may provide varying scopes different from the description in the summary.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments. It is noted that, in accordance with the standard practice in the industry, features are not drawn to scale. In fact, the dimensions of the features may be arbitrarily increased or reduced for clarity of discussion.

In the drawings, like reference numbers generally indicate identical or similar elements. Additionally, generally, the left-most digit(s) of a reference number identifies the drawing in which the reference number first appears.

Figure 1:
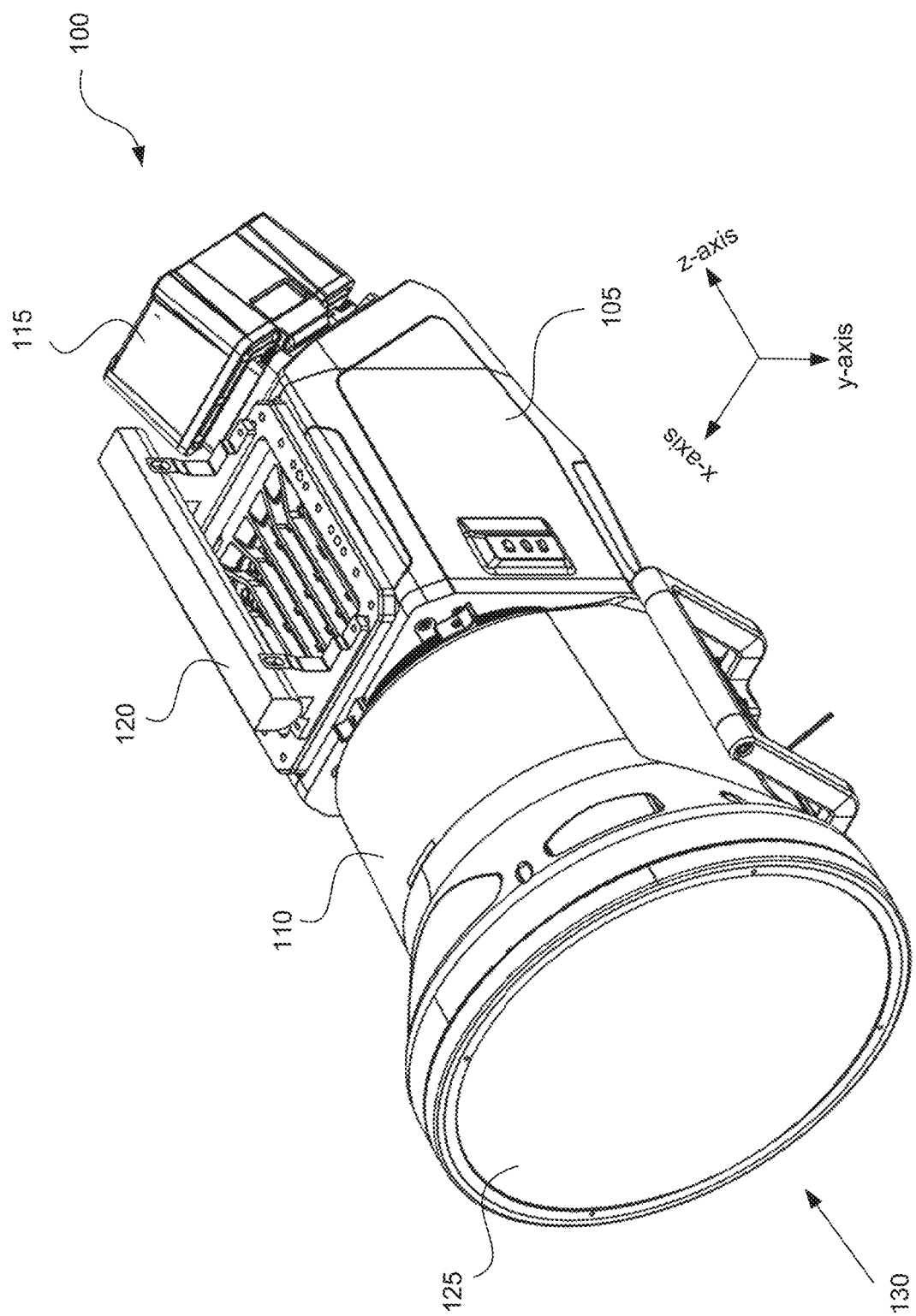
FIG. 1 illustrates a perspective view of an exemplary camera system including a camera body and a lens housing, according to an exemplary embodiment of the present disclosure.

Aspects of the present disclosure will be described with reference to the accompanying drawings.

DETAILED DESCRIPTION

In order for a camera system including a camera lens and a camera body to produce high resolution images for photographs and videos, the camera lens must focus the incoming light onto the focal point of the imaging plane or sensor in the camera body. This may require that a flange depth, pitch (i.e., tilt along a y-axis) and a yaw (i.e., tilt along an x-axis) of the camera lens mount to be adjusted after manufacture. In most cameras where the camera lens is removably attached to the camera body, a flange distance (i.e., distance along a z-axis between the camera lens and the imaging plane of the camera body) may be rotatably adjustable by a user. However, the adjustment of the pitch and the yaw of the camera lens are generally built-in to the camera body and not accessible to the user after manufacture of the camera is complete. Therefore, specialized technicians are needed, making the adjustment process complicated, costly, and inefficient. This is especially an issue for large cameras because slight misalignments of the camera lens may cause significant deviations in the focal point of light on the imaging plane of the camera body. Thus, an external mechanism is needed to allow users to accurately and efficiently adjust a focus of camera lens with respect to an imaging plane in a camera body after manufacturing of the camera is complete.

Embodiments described herein are directed to a camera system having an external mechanism for accurately setting a focus flange depth and/or a focus flange planarity of a camera's lens mount system. Specifically, the external mechanism is configured to allow a user to calibrate depth, pitch, and yaw of at the camera lens mount with respect to an imaging plane in a camera body after manufacture of the camera system is complete. The camera system of the present disclosure includes a lens housing having a distal end, at least one camera lens positioned within the lens housing, a camera body having a front face and an imaging plane within the camera body, and a lens mount removably coupling the distal end of the lens housing to the front face of the camera body via at least one coupling mechanism. In some embodiments, at least one shim may be inserted between the lens mount and the camera body to adjust a depth, pitch, and yaw of the camera lens in the lens housing with respect to the imaging plane in the camera body. A different number of shims inserted along the x- and y-axis of the camera body will adjust the depth, the pitch, the yaw, or a combination of depth, pitch, and yaw of the camera lens, accordingly. For example, three shims may be inserted at different positions along the x- and y-axis of the camera body to simultaneously adjust the depth, pitch, and yaw of the camera lens. Each shim may include a body having an opening extending from an edge of the body to a center of the body. The opening of each shim is configured to receive the at least one coupling mechanism such that the depth, pitch, and yaw may be adjusted without fully removing the lens housing from the camera body. This allows the user to quickly and efficiently adjust the depth, pitch, and yaw of the camera lens, thereby accurately focusing the camera to produce high resolution images without needing complex technical knowledge or service from a specialized technician.

FIG. 1 illustrates a perspective view of an exemplary camera system 100, according to some embodiments of the present disclosure. In one embodiment, camera system 100 includes a camera body 105, a lens housing 110, and a power source 115. Camera body 105 may include a handle 120 that allows a user to support, carry, or otherwise physically manipulate camera system 100. It should be understood by those skilled in the art that other configurations and designs for handle 120 may be used to support camera system 100 in other embodiments of the present disclosure and not exhaustively disclosed herein. In some embodiments, power source 115 may be removably coupled to camera body 105 and configured to provide sufficient voltage to power operations of camera body 105. For example, power source 115 may be a removable battery pack providing a DC voltage to camera body 105. In another example, power source 115 may be a power outlet providing an AC voltage via a plug and wire connectable to camera body 105. In other embodiments, power source 115 may be incorporated into camera body 105 and not removable by a user. For example, power source 115 may be a single use battery or a rechargeable battery positioned within camera body 105.

Lens housing 110 may provide mechanical support for a number of camera lenses 125 positioned along a z-axis of lens housing 110. Each camera lens 125 may be separated by a predetermined distance along the z-axis such that incoming light 130 is ideally focused on an imaging plane in camera body 105. In some embodiments, the predetermined distance between each pair of lens 125 may be a number calculated to achieve a desired focus of incoming light 130 on the imaging plane. It should also be understood by those skilled in the art that the predetermined distance between each pair of lens 125 may be the same or different in various embodiments of the present disclosure. Furthermore, the predetermined distance between each pair of lens 125 may be manually or automatically adjustable in some embodiments of the present disclosure. Lens housing 110 may further include an exterior cover (not separately enumerated) that protects camera lens 125 from the external environment (e.g., dust, weather, debris, etc.).

In some embodiments of camera system 100, lens housing 110 may be removably coupled to camera body 105. This scenario allows a user to exchange one lens housing 110 including a certain configuration of camera lenses 125 that achieve a certain focus with another lens housing 110 including a different configuration of camera lenses 125 that achieve a different focus. In other embodiments of camera system 100, lens housing 110 may be attached to camera body 105 during the manufacturing process of camera system 100 such that a user cannot easily exchange one lens housing 110 with another lens housing 110 without disassembling camera system 100. This scenario may provide a camera system 100 that is more robust (i.e., no possibility of users improperly connecting lens housing 110 to camera body 105, resulting in "slop" in alignment) but less flexible in changing a desired focus of incoming light 130 on the imaging plane.

Figure 2:
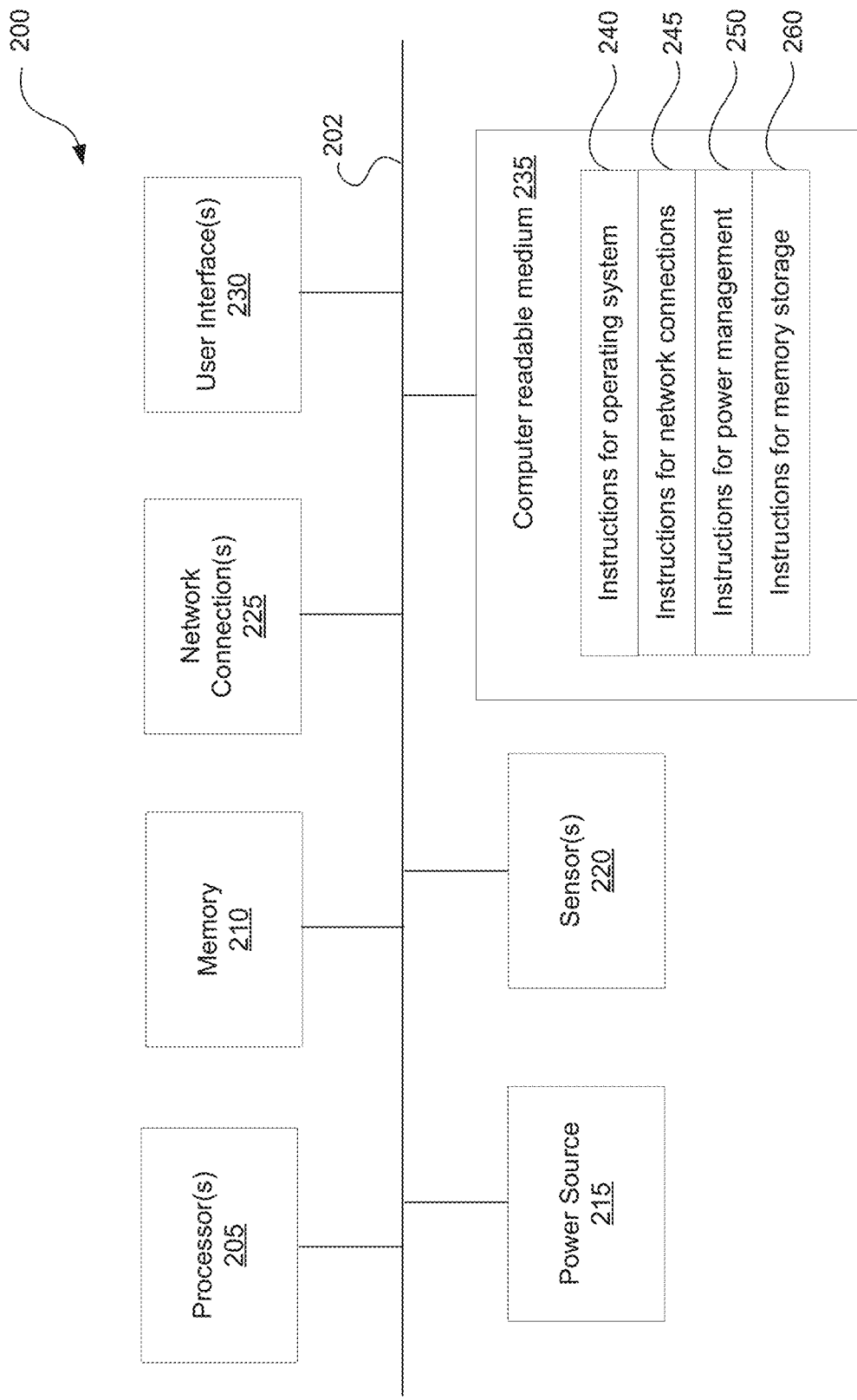
FIG. 2 illustrates a block diagram of an exemplary computer system used within the camera body illustrated in FIG. 1, according to an exemplary embodiment of the present disclosure.

FIG. 2 illustrates a block diagram of an exemplary computer system 200 used within camera body 105 illustrated in FIG. 1, according to an exemplary embodiment of the present disclosure.

Various embodiments may be implemented, for example, using one or more well-known computer systems, such as the exemplary computer system 200 shown in FIG. 2. One or more computer systems 200 may be used, for example, to implement any of the embodiments discussed herein, as well as combinations and sub-combinations thereof. The computer system 200 may be used to control various components of camera system 100, including but not limited to various operations of components within camera body 105 and components within lens housing 110.

In some embodiments, exemplary computer system 200 may include one or more processors 205, a memory 210, a power source 215, one or more sensors 220, one or more network connections 225, one or more user interfaces 230, and one or more computer readable mediums 235. It should be understood by those skilled in the art that other embodiments of the present disclosure may have more components or less components than that listed herein. Each of these components may be coupled by bus 202, which enables communication between various components of the exemplary computer system.

Bus 202 may be any known internal or external bus technology, including but not limited to ISA, EISA, PCI, PCI Express, NuBus, USB, Serial ATA or FireWire. Processors 205 (also called central processing units, or CPUs) may use any known processor technology, including but not limited to graphics processors (also called graphics processing units, or GPUs) and multi-core processors. In some embodiments, a GPU may be a processor that has a specialized electronic circuit design to process mathematically intensive applications. The GPU may have a parallel structure that is efficient for parallel processing of large blocks of data, such as mathematically intensive data common to computer graphics applications, images, videos, etc.

Memory 210 may include a main or primary memory and one or more secondary memories. In some embodiments, the primary memory may be volatile memory, such as cache memory, random access memory (RAM), SDRAM, ROM, etc. The primary memory may include one or more levels of cache that have stored therein control logic (i.e., computer software) and/or data. In some embodiments, the one or more secondary memories may be non-volatile memory, for example, a hard disk drive, optical disks, magnetic tape, floppy disks, flash drives, etc. The one or more secondary memories may include a removable storage drive that may interact with a removable storage unit by reading from and/or writing to the removable storage unit. It should be understood by those skilled in the art that the exemplary types of memories and devices listed herein are not exhaustive, and any other computer data storage devices may be used in other embodiments of the present disclosure.

Power source 215 may be DC voltage (e.g., battery pack) or AC voltage (e.g., wired power outlet), as described above. Sensors 220 may be any type of sensor that allows exemplary computer system 200 to perform operations of camera body 105, including but not limited to image sensors, current sensors, temperature sensors, proximity sensors, etc. Network connections 225 may include transmitters and receivers that allow exemplary computer system 200 to form electrical communications with any combination of external devices, external networks, external entities, etc. For example, network connections 225 may allow computer system 200 to communicate with the Internet or other camera systems 100. In some embodiments, this communication may occur over a communication path, which may be wired and/or wireless (or a combination thereof), and which may include any combination of LANs, WANs, the Internet, etc. Control logic and/or data may be transmitted to and from computer system 200 via the communication path.

User interfaces 230 allow a user to communicate with exemplary computer system 200 and vice versa. In some embodiments, user interfaces 230 may include input devices that allow the user to input control commands to exemplary computer system 200 and display devices that allow exemplary computer system 200 to communicate information and status of operations of camera body 105 to the user. For example, input devices may be any known input device technology, including but not limited to a keyboard (including a virtual keyboard), pointing devices, mouse, track ball, and touch-sensitive pad or display, which allows the user to manually provide an input to exemplary computer system 200. Display devices may be any known display technology, including but not limited to monitors and/or display devices using Liquid Crystal Display (LCD) or Light Emitting Diode (LED) technology. In some embodiments, display devices may be located on camera body 105 and allow exemplary computer system 200 to output information to the user.

Computer-readable medium 235 may be stored on memory 210 and contain instructions to processors 205 for operation of exemplary computer system 200. In some embodiments, computer-readable medium 235 may include various instructions 240-260. In one example, computer-readable medium 235 may include various instructions 240 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input devices of user interfaces 230; sending output to display devices of user interfaces 230; organizing files and directories on memory 210; controlling accessory devices connected to camera body 105 (e.g., adjusting the predetermined distance between camera lens 125 in attached lens housing 110), which can be controlled directly or through an I/O controller; and managing traffic on bus 202. In another example, computer-readable medium 235 may also include various instructions 245 for establishing and maintaining network connections (e.g., software for implementing communication protocols, such as TCP/IP, HTTP, Ethernet, telephony, etc.). In another example, computer-readable medium 235 may further include various instructions 250 to perform power management based on information collected by sensors 220 (e.g., enter power saving mode when voltage from power source 215 falls below a threshold). In yet another example, computer-readable medium 235 may further include various instructions 260 to perform memory storage operations to store captured images to memory 210. The exemplary instructions described herein are for illustrative purposes only and are not intended to be exhaustive. Those of ordinary skill in the art will recognize that various other types of instructions achieving different purposes may be included in computer-readable medium 235 in other embodiments of the present disclosure.

Exemplary computer system 200 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Exemplary computer system 200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. Such control logic, when executed by one or more data processing devices (such as the computer system 200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 2. In particular, embodiments can operate with software, hardware, and/or operating system implementations other than those described herein.

Figure 3:
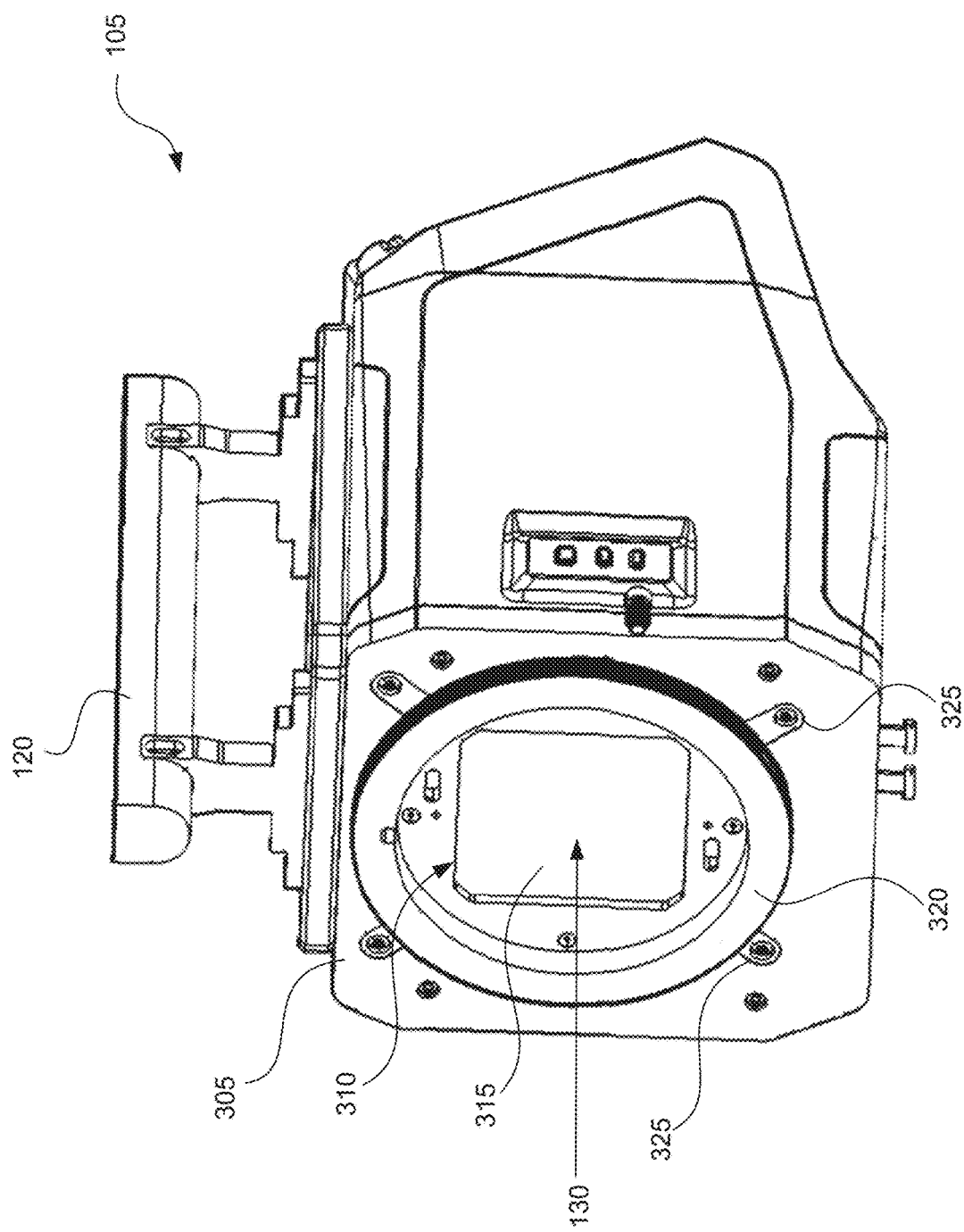
FIG. 3 illustrates a perspective view of the camera body with a lens mount, according to an exemplary embodiment of the present disclosure.
Figure 4:
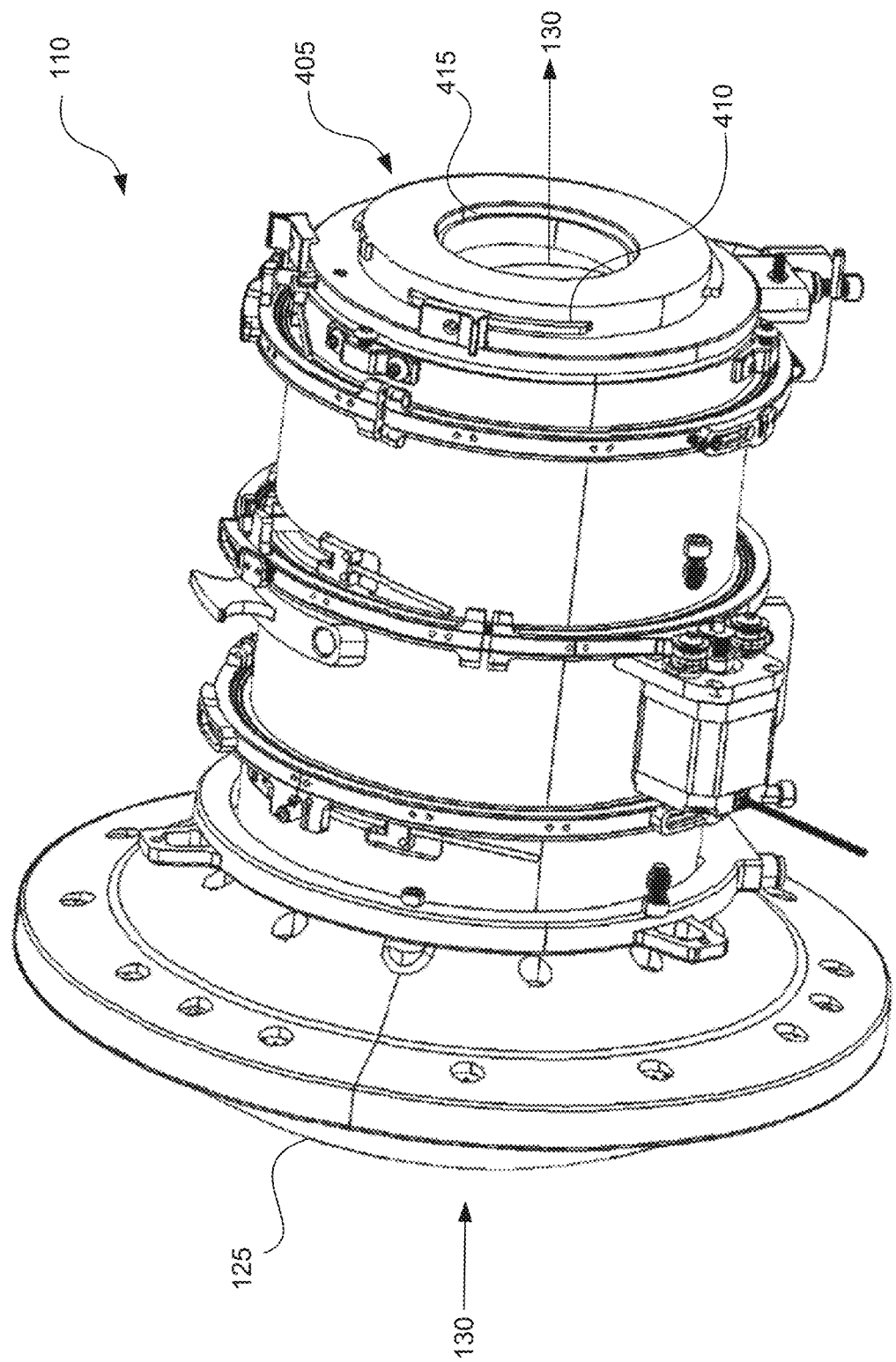
FIG. 4 illustrates a perspective view of the lens housing with an exterior cover removed, according to an exemplary embodiment of the present disclosure.

FIGS. 3 and 4 illustrate perspective views of camera body 105 (see FIG. 3) and lens housing 110 (see FIG. 4) removably coupled together via a lens mount 320 (see FIG. 3) to form camera system 100 illustrated in FIG. 1, according to some embodiments of the present disclosure.

FIG. 3 illustrates a perspective view of camera body 105 with lens mount 320, according to some embodiments of the present disclosure. In the embodiment of FIG. 3, camera body 105 has a front face 305 with an opening 310. An imaging plane 315 is positioned within camera body 105 and parallel to front face 305 such that imaging plane 315 is exposed to incoming light 130 through opening 310. Imaging plane 315 may include sensors (e.g., imaging sensors, light sensors, color sensors, etc.) configured to capture an image from incoming light 130 through opening 310. A lens mount 320 is coupled to front face 305 of camera body 105 via at least one coupling mechanism 325. In the embodiment of FIG. 3, four coupling mechanisms 325 are evenly spaced around a circumference of lens mount 320 and used to secure lens mount 320 to front face 305 of camera body 105, each coupling mechanisms 325 utilizing a fastener and screw configuration, described in further detail with reference to FIGS. 6A and 6B. It should be understood by those skilled in the art that other embodiments of the present disclosure may include more or less coupling mechanisms 325 to secure lens mount 320 to front face 305 of camera body 105. Furthermore, other embodiments of the present disclosure may utilize other fastening configurations, including but not limited to Velcro, epoxy, staples, nails, rail and groove, etc., to secure lens mount 320 to front face 305 of camera body 105.

FIG. 4 illustrates a perspective view of lens housing 110 with an exterior cover removed, according to an exemplary embodiment of the present disclosure. In the embodiment of FIG. 4, lens housing 110 has a distal end 405 configured to be removably coupled to lens mount 320 illustrated in FIG. 3. For example, lens mount 320 and distal end 405 may both be designed as rings of different sizes configured to receive each other. In the embodiment illustrated in FIGS. 3 and 4, the ring of distal end 405 may be smaller than the ring of lens mount 320 such that lens mount 320 receives distal end 405 of lens housing 110. Specifically, an interior circumference (not separately enumerated) of lens mount 320 may have a threaded insert configured to receive and rotatably couple a threaded screw on an exterior circumference 410 of distal end 405. It should be understood by those skilled in the art that lens mount 320 and distal end 405 may be designed as other shapes and sizes in various embodiments of the present disclosure and not exhaustively disclosed herein. Furthermore, lens mount 320 and distal end 405 may have different coupling mechanism designs, such tab and indent configurations, ball and socket joints, and other types of mechanical connectors not exhaustively described herein.

Referring to FIGS. 3 and 4, distal end 405 of lens housing 110 includes an opening 415. When lens housing 110 is removably coupled to camera body 105 via lens mount 320, opening 310 in front face 305 of camera body 105 aligns with opening 415 of distal end 405 of lens housing 110 such that incoming light 130 travels through camera lens 125 in lens housing 110 and focuses on imaging plane 315 in camera body 105. As shown in FIG. 3, lens mount 320 is configured to surround opening 310 and imaging plane 315 such that when lens housing 110 is removably coupled to camera body 105, lens mount 320 creates a sealed environment for incoming light 130 to ensure that ambient light from the environment does not affect the image captured by imaging plane 315.

In order to obtain high resolution images, it is preferable in some embodiments to focus incoming light 130 to a center of imaging plane 305 in camera body 105. Therefore, in some embodiments, the user may desire to adjust a pitch (i.e., tilt along the y-axis) and a yaw (i.e., tilt along the x-axis) of lens housing 110 such that camera lens 125 better focuses incoming light 130 to the center of imaging plane 305. Inserting shims at various locations between lens mount 320 and front face 305 of camera body 105 may allow for this adjustment to be done after the manufacturing process of camera system 100 has been completed. Shims will now be described in further detail with respect to FIGS. 5-12 below.

Figure 5:
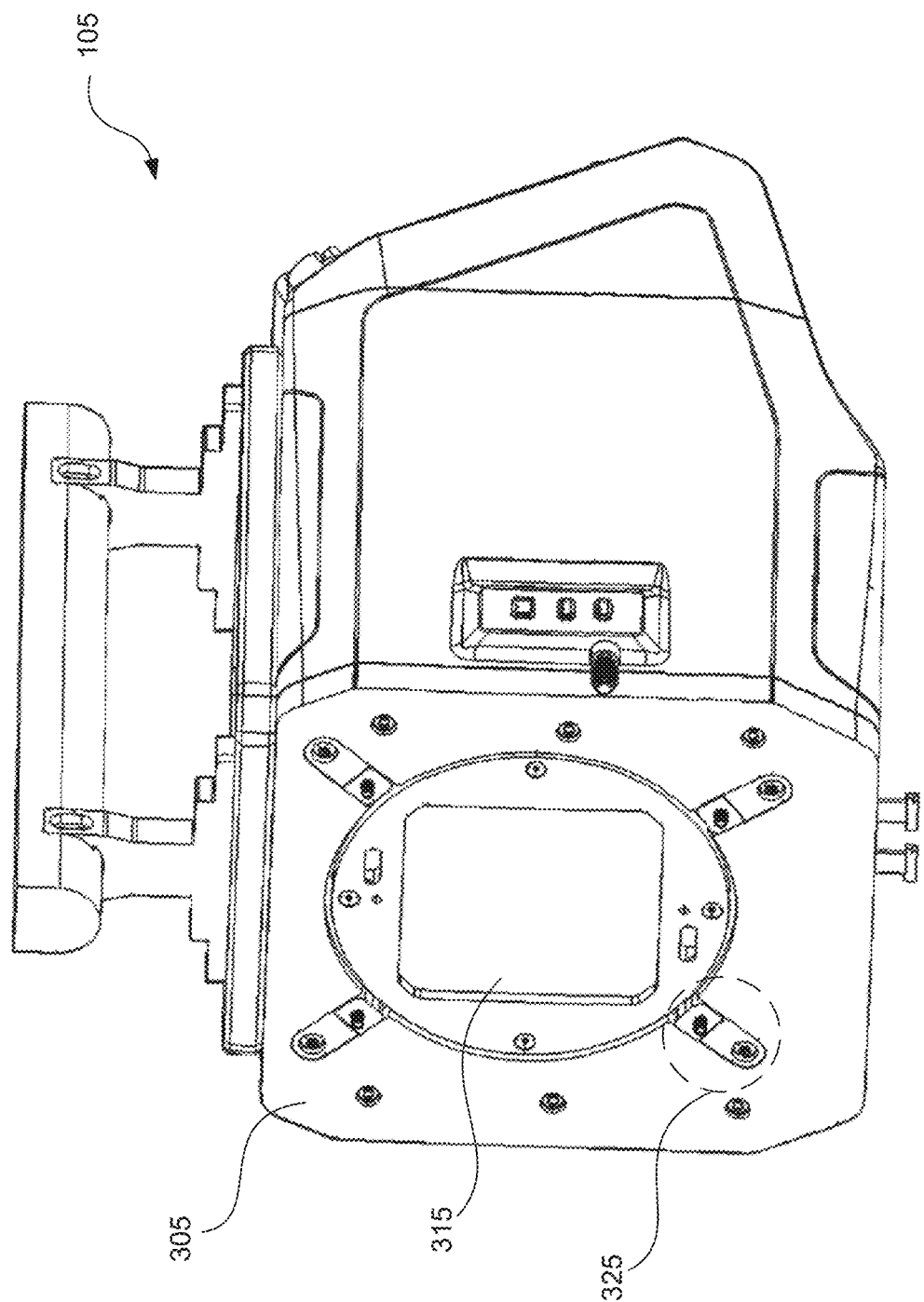
FIG. 5 illustrates a perspective view of the camera body with the lens mount removed, according to an exemplary embodiment of the present disclosure.
Figure 6B:
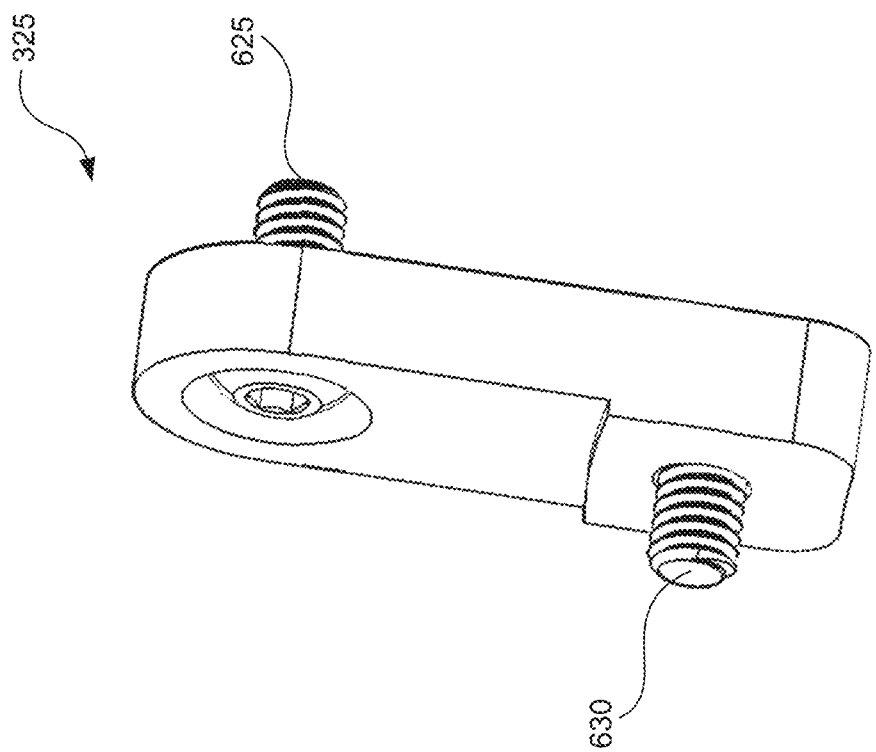
FIG. 6B illustrates a perspective view of the coupling mechanism of the lens mount with all fasteners inserted, according to an exemplary embodiment of the present disclosure.
Figure 6A:
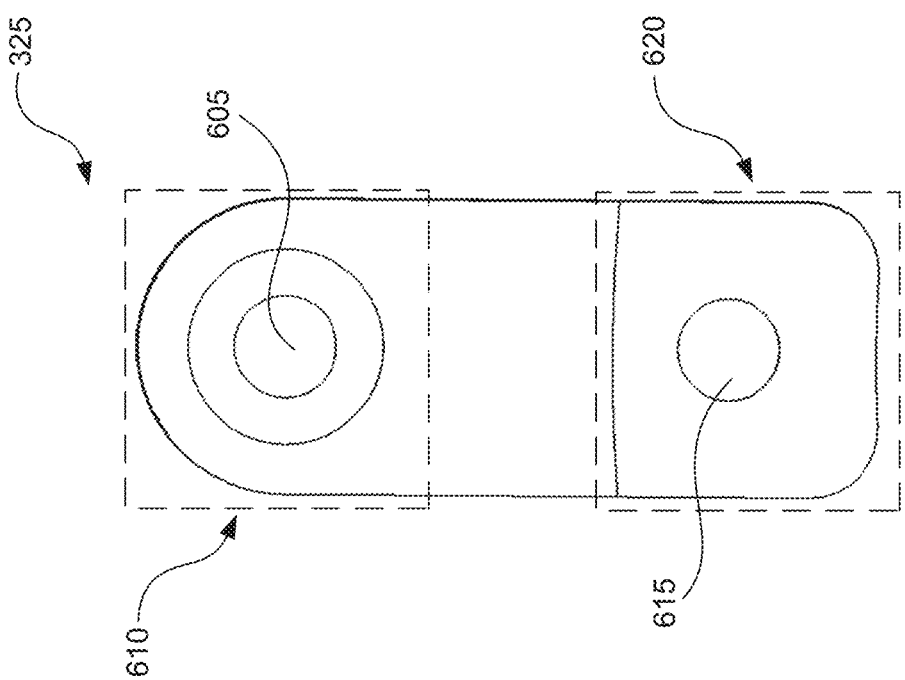
FIG. 6A illustrates a frontal view of a coupling mechanism of the lens mount with all fasteners removed, according to an exemplary embodiment of the present disclosure.

FIG. 5 illustrates a perspective view of camera body 105 with lens mount 320 removed, according to an exemplary embodiment of the present disclosure. After removing lens mount 320, FIG. 5 shows coupling mechanism 325 without any obstructions. FIGS. 6A and 6B illustrate enlarged views of coupling mechanism 325, according to some embodiments of the present disclosure. Specifically, FIG. 6A illustrates a frontal view of coupling mechanism 325 with all fasteners removed, and FIG. 6B illustrates a perspective view of coupling mechanism 325 with all fasteners inserted, according to some embodiments of the present disclosure.

Referring to the embodiment illustrated in FIG. 6A, coupling mechanism 325 includes a top hole 605 located in a top portion 610 of coupling mechanism 325 and a bottom hole 615 located in a bottom portion 620 of coupling mechanism 325. Referring to the embodiment illustrated in FIG. 6B, top hole 605 is configured to receive a first fastener 625 while bottom hole 615 is configured to receive a second fastener 630. First fastener 625 is configured to fasten coupling mechanism 325 to front face 305 of camera body 105 (see FIG. 5) while second fastener 630 is configured to fasten coupling mechanism 325 to lens mount 320 (see FIG. 3). In some embodiments, first fastener 625 and second fastener 630 are screws. It should be understood by those skilled in the art that other types of fasteners not exhaustively listed herein may be used in other embodiments of the present disclosure. Furthermore, it should be understood by those skilled in the art that other configurations of top hole 605, bottom hole 615, first fastener 625, and second fastener 630 may be implemented in other embodiments without deviating from the teachings of the present disclosure. For example, in another embodiment, first fastener 625 may fasten coupling mechanism 325 to lens mount 320 while second fastener 630 may fasten coupling mechanism 325 to front face 305 of camera body 105.

Shims may be used to adjust the pitch and the yaw of lens housing 110 with respect to camera body 105, as described in further detail below with reference to FIGS. 7A and 7B.

Figure 7B:
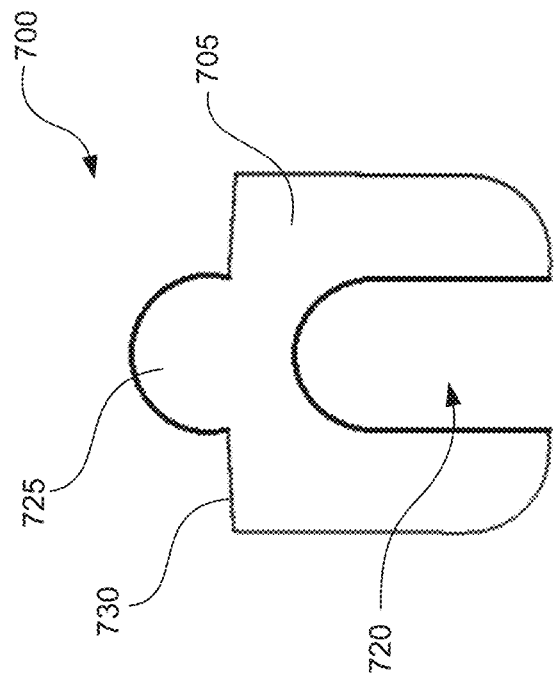
FIG. 7A and FIG. 7B illustrate exemplary configurations of a shim for adjusting a depth, a pitch, and a yaw of the lens housing with respect to the camera body, according to an exemplary embodiment of the present disclosure.
Figure 7A:
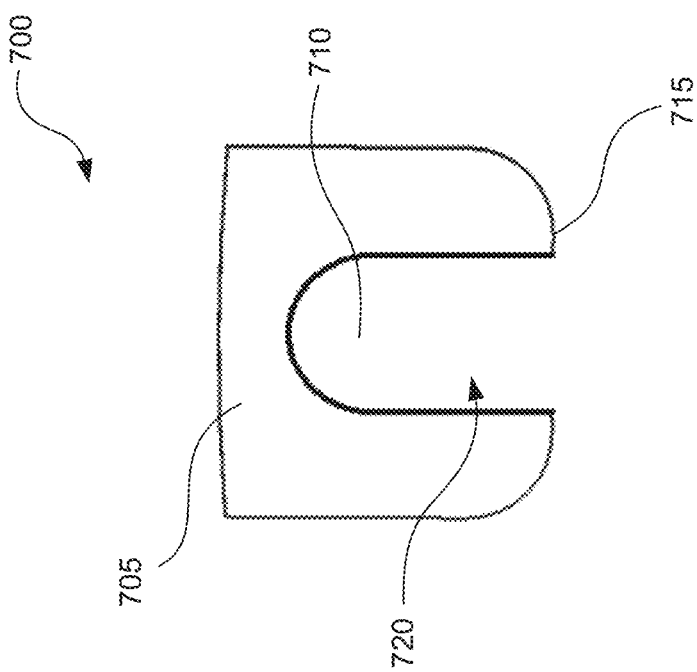

FIG. 7A and FIG. 7B illustrate exemplary configurations of a shim 700. Referring to the embodiment illustrated in FIG. 7A, exemplary shim 700 may include a body 705 with a center 710 and a bottom edge 715. An opening 720 may extend from center 710 of body 705 to bottom edge 715 of body 705. Opening 720 is configured to receive second fastener 630 after shim 700 is slid downwards from top portion 610 of coupling mechanism 325 towards bottom portion 620 of coupling mechanism 325 (see FIGS. 6A and 6B). This allows shim 700 to be externally inserted between front face 305 of camera body 105 and lens mount 320 to adjust the pitch and the yaw without having to fully remove lens mount 320 from front face 305 of camera body 105. For example, second fastener 630 coupling lens mount 320 to front face 305 of camera body 105 may be partially loosened to create a sufficient gap to insert shim 700 without fully disengaging lens mount 320 from front face 305 of camera body 105.

In some embodiments, opening 720 may be a circular shape such that body 705 of exemplary shim 700 is a horseshoe shape. However, it should be understood by those skilled in the art that opening 720 may be designed as any other shape (e.g., slits) capable of receiving second fastener 630 during the insertion process described above. In some embodiments, shim 700 may be inserted between front face 305 of camera body 105 and lens mount 320 to adjust the pitch and the yaw. However, it should be understood by those skilled in the art that shims 700 may also be inserted between distal end 405 of lens housing 110 and lens mount 320 to adjust the pitch and the yaw in other embodiments of the present disclosure. Furthermore, in various embodiments of the present disclosure, exemplary shim 700 may be made of various materials (e.g., Brass, Stainless Steel, Plastic) and have exemplary dimensions of 0.02", 0.01", 0.005", 0.001", 0.0005".

Referring to FIG. 7B, another exemplary configuration of shim 700 may include a handle 725 attached to an upper edge 730 of body 705. Handle 725 may be shaped as a knob or any other suitable shape for a user to conveniently handle and manipulate shim 700 in various other embodiments of the present disclosure. Once shim 700 is inserted into position with opening 720 receiving second fastener 630 of coupling mechanism 325, handle 725 is configured to extend into top portion 610 of coupling mechanism 325 such that handle 725 is accessible by a user after lens mount 320 is re-fastened to proximately abut front face 305 of camera body 105. In some embodiments, shim 700 may be made of a flexible material, allowing handle 725 to be bent at an angle with respect to body 705 of shim 700 for easier access by a user.

It should be understood by those skilled in the art that the exemplary configurations of shim 700 shown in FIGS. 7A and 7B are for illustrative purposes only and not intended to be limiting on embodiments of the present disclosure. In other embodiments, different configurations with different shapes and dimensions for body 705, opening 720, and handle 725 may be used without deviating from the teachings of the present disclosure.

When exemplary shims 700 are inserted between front face 305 of camera body 105 and lens mount 320, the gap created may allow pollutants from the ambient environment (e.g., dust, debris, weather, light, etc.) to enter opening 310 in front face 305 of camera body 105, thereby affecting the image captured by imaging plane 315 (see FIG. 3). To prevent this issue, lens mount 320 may include a sealing mechanism in some embodiments of the present disclosure, which will now be described in further detail with reference to FIGS. 8-11 below.

Figure 8:
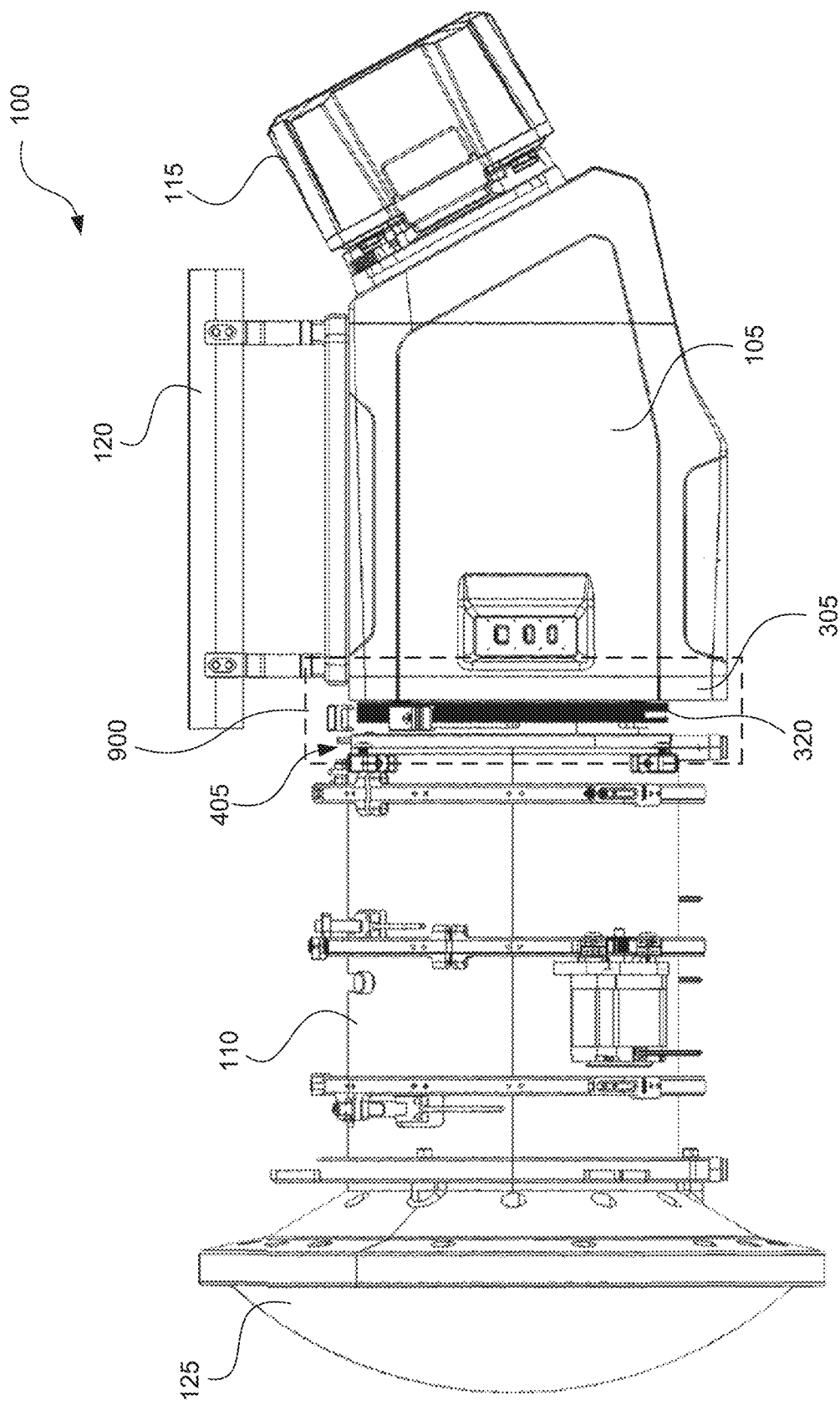
FIG. 8 illustrates a side view of the camera system shown in FIG. 1, according to an exemplary embodiment of the present disclosure.
Figure 9:
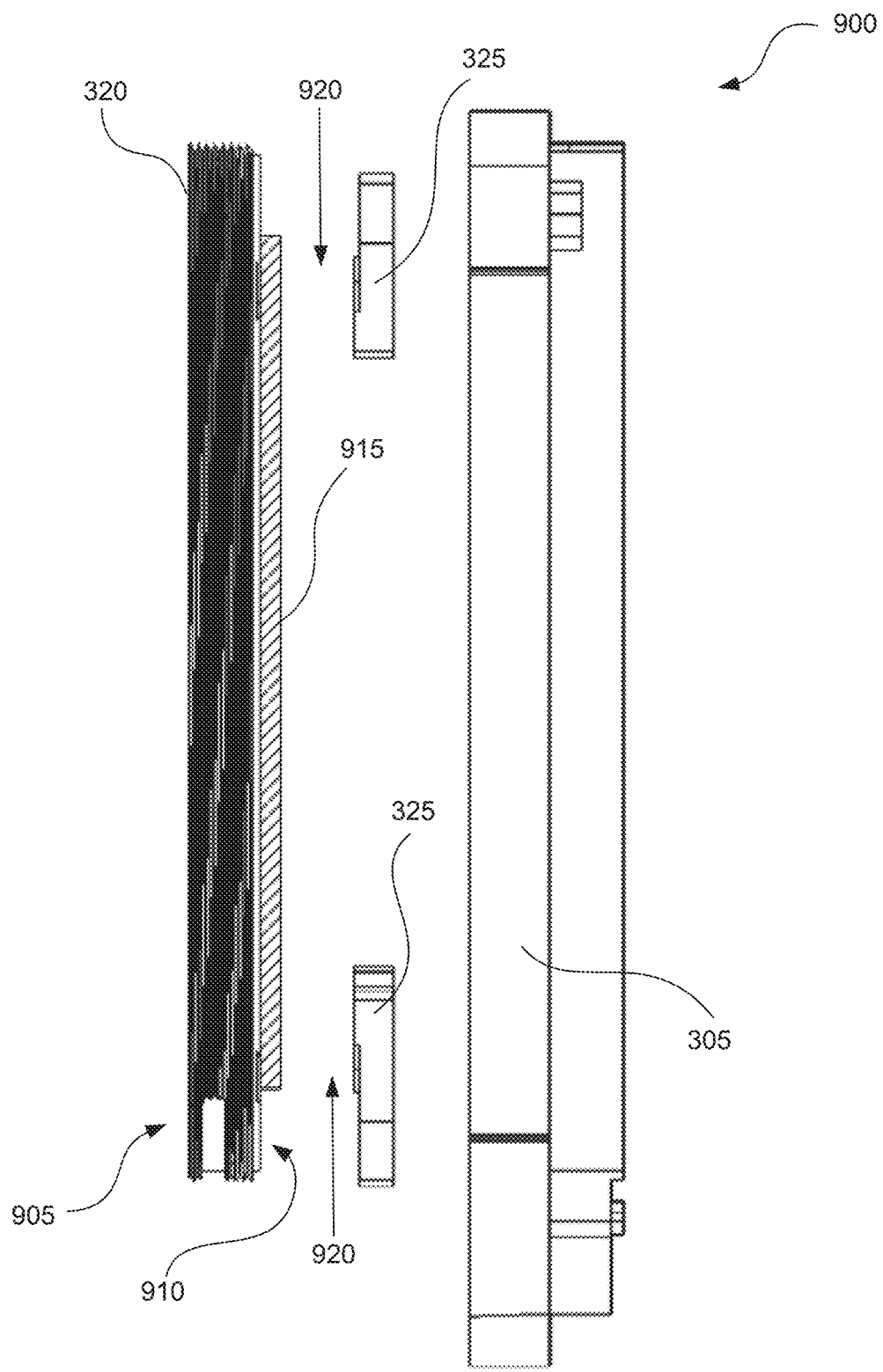
FIG. 9 illustrates an exploded side view of the lens mount, the coupling mechanism, and a front face of the camera body, according to an exemplary embodiment of the present disclosure.

FIG. 8 illustrates a side view of camera system 100 illustrated in FIG. 1, according to an exemplary embodiment of the present disclosure. As shown in the embodiment of FIG. 8 and as explained above, lens mount 320 removably couples distal end 405 of lens housing 110 to front face 305 of camera body 105 via coupling mechanisms 325 (not illustrated). FIG. 9 illustrates an exploded side view of lens mount 320, coupling mechanisms 325, and front face 305 of camera body 105 (collectively "900"). When shims 700 are used to adjust the pitch and/or the yaw of lens housing 110 with respect to camera body, shims 700 may be inserted at position 920 between lens mount 320 and coupling mechanisms 325 such that opening 710 of shim 700 receives second fastener 630 of coupling mechanism 325 (see FIGS. 6A-7B). This insertion of shim 700 distances lens mount 320 away from coupling mechanism 325 and front face 305 of camera body 105 by a width of shim 700. Since coupling mechanisms 325 are only located at a number of select points around the circumference of lens mount 320 (see FIGS. 3 and 5), inserted shims 700 will create a gap in assembled camera system 100 between lens mount 320 and front face 305 of camera body 105 at all locations around the circumference of lens mount 320 without a coupling mechanism 325. This gap may potentially allow pollutants to enter opening 310 in front face 305 of camera body 105 and detrimentally affect the image captured by imaging plane 315 (see FIG. 3). Accordingly, a sealing mechanism 915 is needed, as explained in further detail below with additional reference to FIGS. 10-11, respectively illustrating perspective views of lens mount 320 with sealing mechanism 915 (see FIG. 10) and front face 305 of camera body 105 with groove for receiving sealing mechanism 915 (see FIG. 11).

Figure 10:
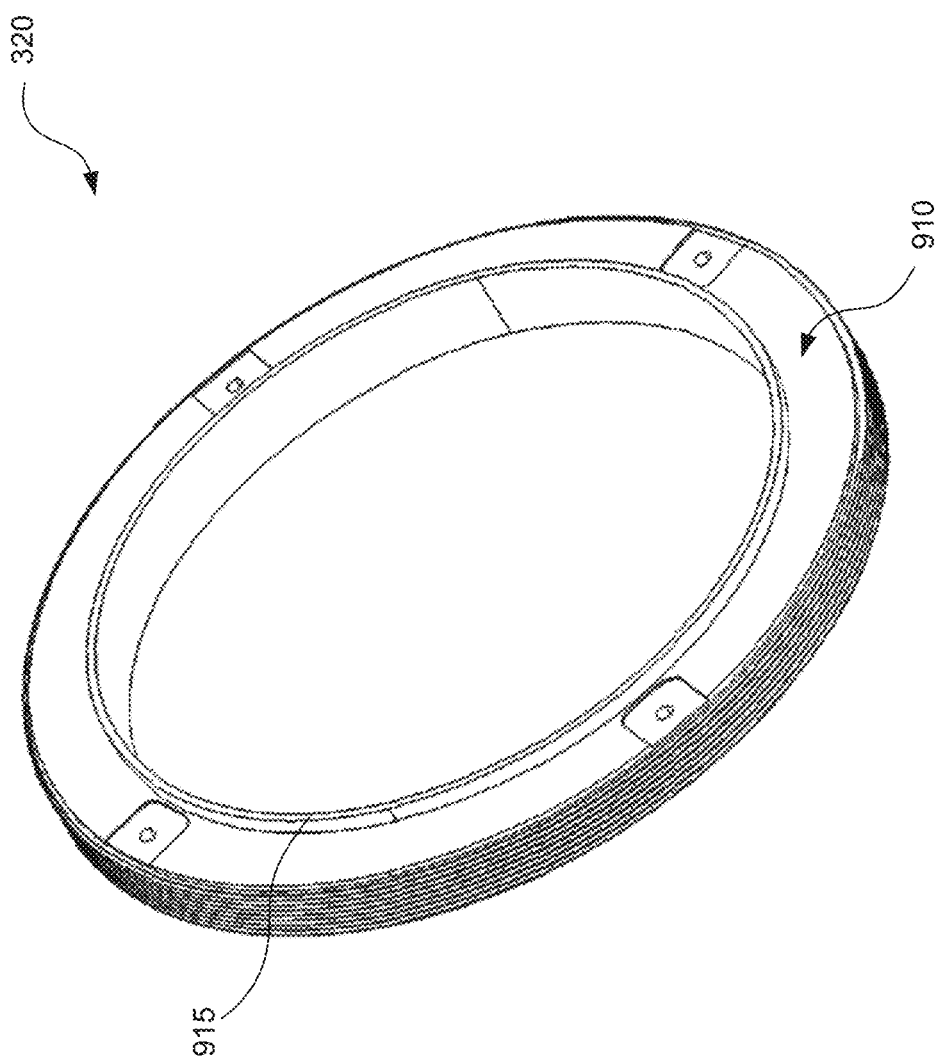
FIG. 10 illustrates a perspective view of the lens mount with a sealing mechanism, according to an exemplary embodiment of the present disclosure.

Referring to FIG. 9, lens mount 320 may include a first side 905 configured to abut distal end 405 of lens housing 110 and a second side 910 configured to abut front face 305 of camera body 105 in assembled camera system 100 (also see FIG. 8). Second side 910 of lens mount 320 may further include a sealing mechanism 915 protruding from second side 910. Referring to FIG. 10, in some embodiments, sealing mechanism 915 may be a ring extending the interior circumference of lens mount 320 on second side 910. It should be understood by those skilled in the art that sealing mechanism 915 may be of a different shape or be located at a different location on second side 910 of lens mount 320 in other embodiments of the present disclosure not exhaustively described herein. Furthermore, it should be understood by those skilled in the art that sealing mechanism 915 may be made of different materials and have different dimensions in other embodiments of the present disclosure. For example, in some embodiments, sealing mechanism 915 may be a rubber gasket configured to keep dust and light from polluting the image captured by camera system 100.

Figure 11:
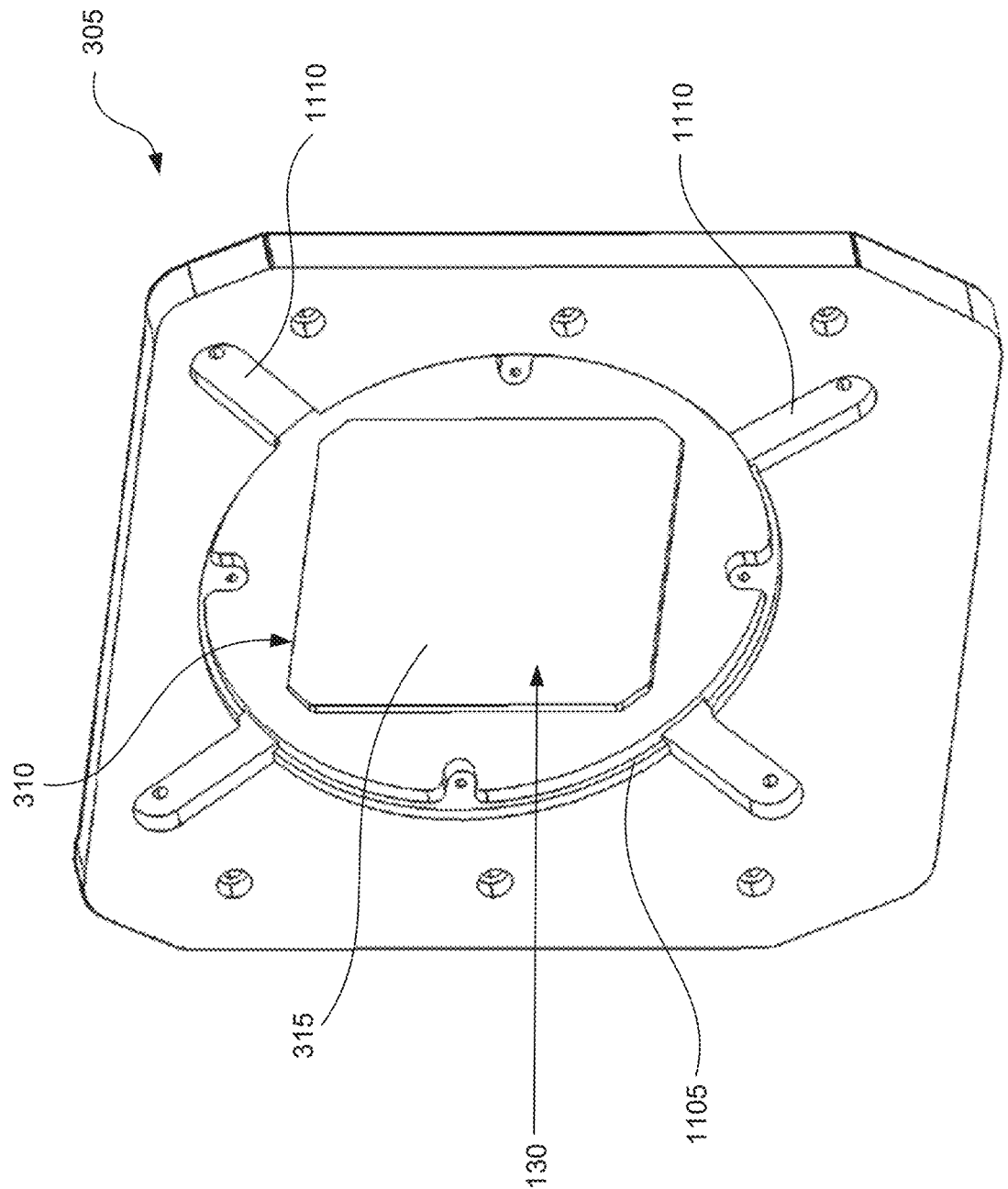
FIG. 11 illustrates a perspective view of the front face of the camera body with a groove for receiving the sealing mechanism of the lens mount, according to an exemplary embodiment of the present disclosure.

Referring to FIG. 11, front face 305 of camera body 105 may include a groove 1105 configured to receive sealing mechanism 915. In some embodiments, groove 1105 may be designed as a depression section set into front face 305 of camera body 105 and configured to receive sealing mechanism 915. It should be understood by those skilled in the art that groove 1105 may be various mechanical configurations configured to receive sealing mechanism 915 in other embodiments of the present disclosure and not exhaustively listed herein. Front face 305 of camera body 105 may also include indents 1110 configured to receive coupling mechanisms 325. Groove 1105 and indents 1110 work together to receive sealing mechanism 915 and coupling mechanisms 325, respectively, so that even after shims 700 are inserted to adjust the pitch and/or the yaw, opening 310 remains sealed from potential environment pollutants, thus protecting the image captured by imaging plane 315.

Figure 12A:
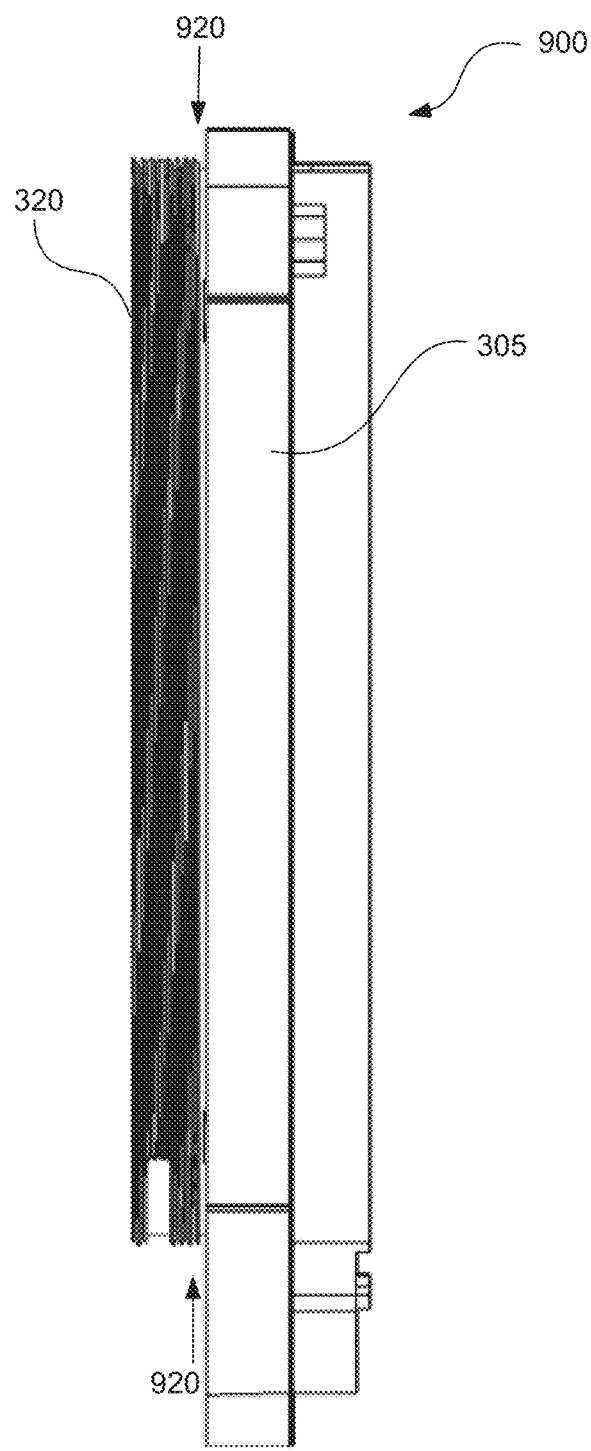
FIG. 12A illustrates a side view of the lens mount, the coupling mechanism, and the front face of the camera body when no shims are inserted, according to an exemplary embodiment of the present disclosure.
Figure 12B:
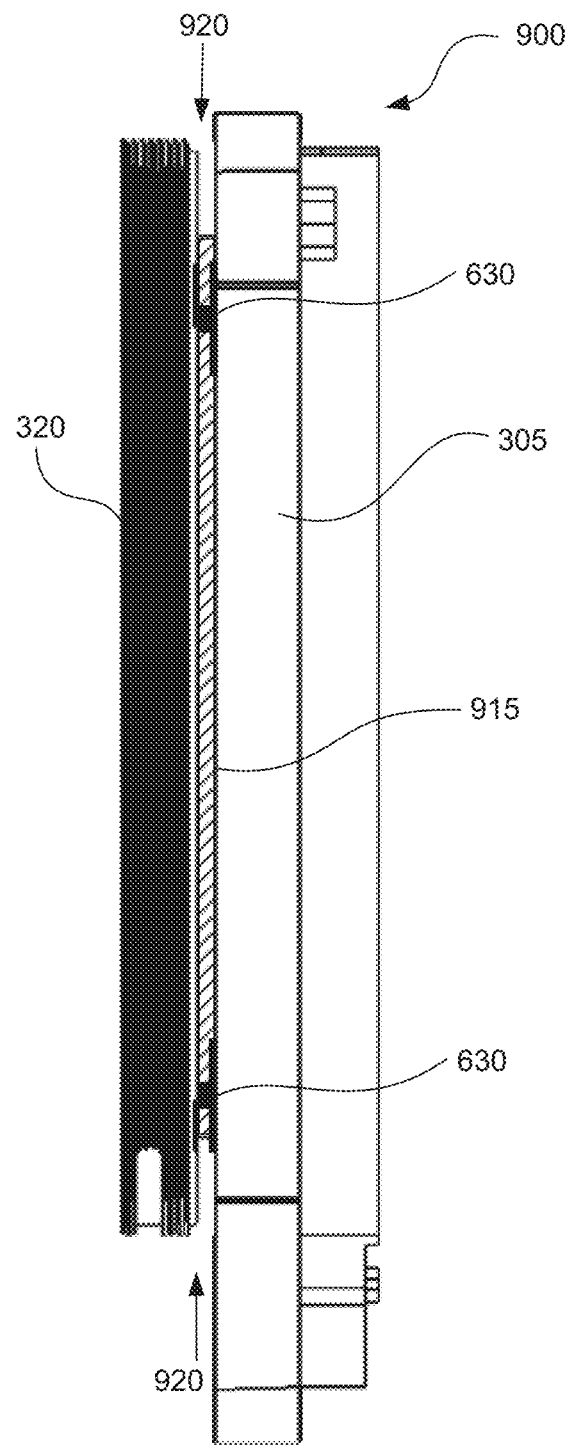
FIG. 12B illustrates a side view of the lens mount, the coupling mechanism, and the front face of the camera body when shims are inserted, according to an exemplary embodiment of the present disclosure.

FIG. 12A illustrates a side view of the collection of components 900 shown in FIG. 9 when no shims 700 are inserted at position 920, whereas FIG. 12B illustrates a side view of the collection of components 900 shown in FIG. 9 when shims 700 are inserted at position 920, according to an exemplary embodiment of the present disclosure. Referring to FIG. 12A, when no shims 700 are inserted at position 920 between lens mount 320 and coupling mechanism 325, second side 910 of lens mount 320 fully abuts front face 305 of camera body 105, thus sealing opening 310 in front face 305 from any potential environment pollutants. In this scenario, indents 1110 in front face 305 fully receive coupling mechanisms 325 and groove 1105 in front face 305 fully receives sealing mechanism 915 of lens mount 320 (see FIGS. 10 and 11).

On the other hand, referring to FIG. 12B, when shims 700 are inserted at position 920 between lens mount 320 and coupling mechanism 325, second side 910 of lens mount 320 is distanced away from front face 305 of camera body 105 by shim 700. In this scenario, sealing mechanism 915 of lens mount 320 is partially removed from groove 1105 in front face 305 but maintains contact with groove 1105. This allows sealing mechanism 915 to seal the gap that would otherwise be created between lens mount 320 and front face 305 of camera body 105, thus preventing any potential environment pollutants from entering opening 310 in front face 305. In order for sealing mechanism 915 to effectively seal the gap created by shims 700, a height of sealing mechanism 915 must be greater than a collective depth of shims 700 inserted at one point around the circumference of lens mount 320. It should be understood by those skilled in the art that the height of sealing mechanism 915 may be calculatedly different in various embodiments of the present disclosure without deviating from the teachings of the present disclosure. Furthermore, in various embodiments, the height of sealing mechanism 915 may be constant or change along the circumference of lens mount 320. Variations in the mechanical design of sealing mechanism 915 understood by those skilled in the art do not deviate from the present teachings and are not exhaustively described herein.

Figure 13:
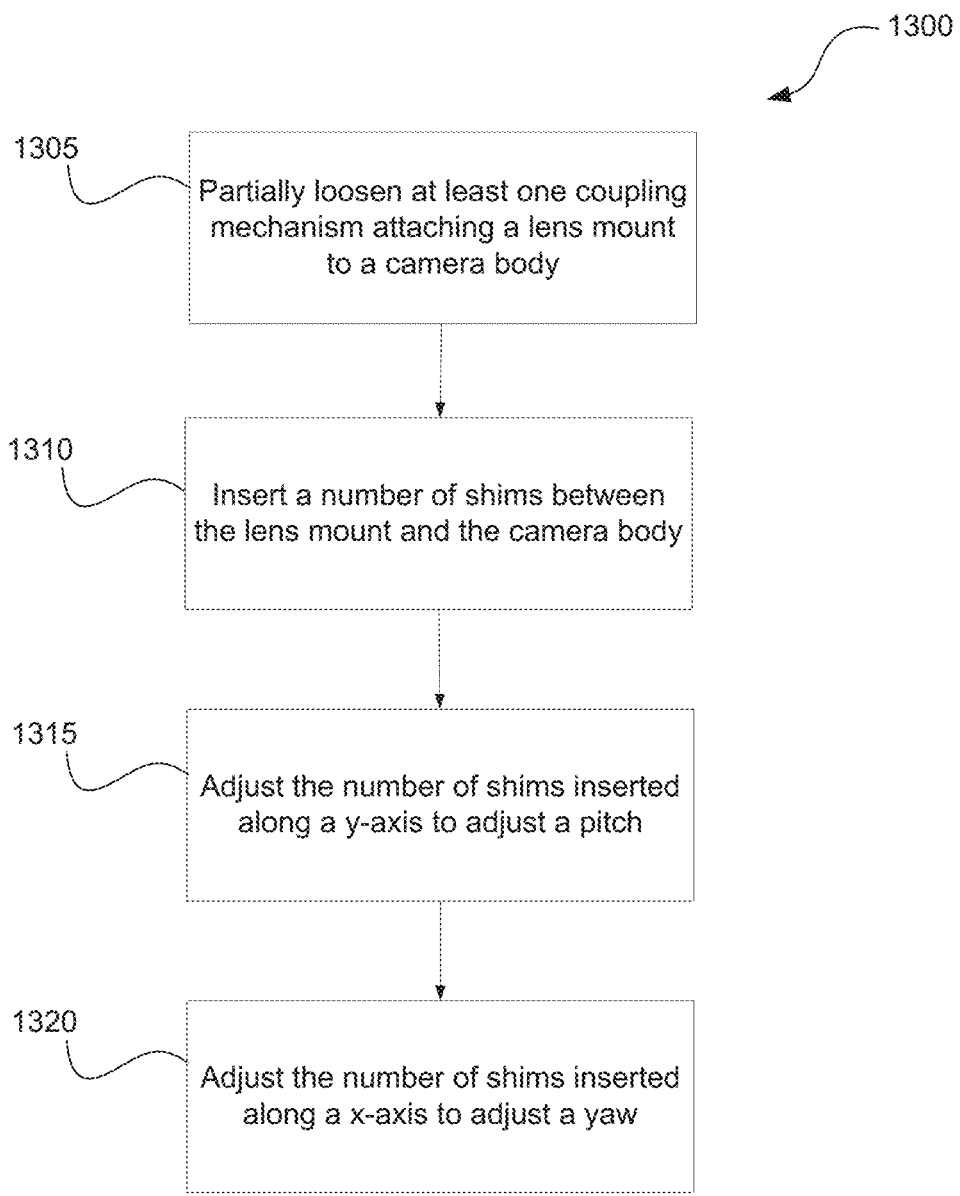
FIG. 13 shows a flow diagram illustrating a method for using the shim to adjust the pitch and the yaw of the lens housing with respect to the camera body, according to an exemplary embodiment of the present disclosure.

FIG. 13 shows a flow diagram illustrating a method 1300 for using shims 700 to adjust the pitch and the yaw of lens housing 110 with respect to camera body 105, according to an exemplary embodiment of the present disclosure. At step 1305, method 1300 partially loosens at least one coupling mechanism 325 attaching lens mount 320 to front face 305 of camera body 105. For example, as shown in the exemplary embodiment of FIG. 12B, method 1300 may partially loosen second fastener 630 of coupling mechanism 325 such that second side 910 of lens mount 320 is distanced away from abutting front face 305 of camera body 105. After creating a sufficient gap to fit a desired number of shims 700, step 1310 of method 1300 inserts a number of shims 700 between lens mount 320 and camera body 105. Specifically, as explained above with reference to FIGS. 6A-7B, each shim 700 may be externally inserted by sliding downwards from top portion 610 of coupling mechanism 325 towards bottom portion 620 of coupling mechanism 325 until opening 720 of shim 700 receives second fastener 630 of coupling mechanism 325. It should be understood by those skilled in the art that the number of shims 700 inserted by step 1310 of method 1300 may differ in various embodiments of the present disclosure depending on a user's desired amount of adjustment of the pitch and/or the yaw. In some embodiments, users may use resolution target charts to calibrate an optimal resolution in the x- and y-axis and insert a calculated number of shims 700 corresponding to the desired adjustment. Specific adjustment of the pitch vs. the yaw of lens housing 110 with respect to camera body 105 is described in further detail below.

At step 1315, method 1300 may adjust the pitch (i.e., tilt along the y-axis) of lens housing 110 with respect to camera body 105 by adjusting the number of shims 700 inserted along the y-axis of lens mount 320. For example, as shown in the embodiments of FIGS. 3 and 4, if incoming light 130 is focused on a point higher than the center of imaging plane 315, then lens housing 110 may be positioned at a depressed angle on the z-axis with respect to camera body 105. To adjust the pitch in this scenario, shims 700 may be inserted towards a bottom of lens mount 320 so that lens housing 110 will become level with respect to camera body 105 along the z-axis. Vice versa, if incoming light 130 is focused on a point lower than the center of imaging plane 315, then lens housing 110 may be positioned at an elevated angle on the z-axis with respect to camera body 105 and shims 700 may be inserted towards a top of lens mount 320 to adjust the pitch.

Similarly, at step 1320, method 1300 may adjust the yaw (i.e., tilt along the x-axis) of lens housing 110 with respect to camera body 105 by adjusting the number of shims 700 inserted along the x-axis of lens mount 320. It should be understood by those skilled in the art that method 1300 may execute steps 1315 and 1320 in isolation or in combination. Executing step 1315 or step 1320 in isolation allows the pitch to be adjusted but not the yaw, and vice versa. Executing a combination of step 1315 and step 1320 allows method 1300 to adjust a combination of both the pitch and the yaw of camera system 100. This allows a user 3600 free adjustment of the alignment of lens housing 110 with respect to camera body 105 in the xy-plane until incoming light 130 is perfectly focused on the center of imaging plane 315, thereby allowing camera system 100 to generate higher resolution images for photographs and/or videos.

It should be understood by those skilled in the art that some operations of method 1300 described above may be performed in a different order and/or vary, and method 1300 may include more operations that are not described herein for simplicity.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A camera system, comprising:
   a camera body having an imaging plane;
   a lens housing having a camera lens positioned within the lens housing;
   a lens mount to couple the lens housing to the camera body,
   wherein the lens mount and the camera body are separable by a gap to insert a shim between the lens mount and the camera body to adjust the lens housing with respect to the camera body.

2. The camera system of claim 1, wherein the lens mount and the camera body are separable by the gap to insert the shim between the lens mount and the camera body to adjust the lens housing with respect to the camera body without fully removing the lens mount from the camera body.

3. The camera system of claim 1, wherein the lens mount and the camera body are separable by the gap to insert the shim between the lens mount and the camera body to adjust a depth, pitch, and yaw of the camera lens with respect to the imaging plane.

4. The camera system of claim 1, further comprising a coupling mechanism to couple the lens mount to the camera body.

5. The camera system of claim 4, wherein the coupling mechanism comprises:
   a first fastener, located in a top hole of a top portion of the coupling mechanism, to couple the coupling mechanism to the camera body; and
   a second fastener, located in a bottom hole of a bottom portion of the coupling mechanism, to couple the coupling mechanism to the lens mount.

6. The camera system of claim 5, wherein the second fastener is partially loosened to create the gap without fully disengaging the lens mount from the camera body.

7. The camera system of claim 5, wherein the second fastener is configured to receive the shim as the shim is slid from the top portion of the coupling mechanism towards the bottom portion of the coupling mechanism portion.

8. The camera system of claim 1, wherein the lens mount comprises a sealing mechanism coupled to camera body to seal the gap between the lens mount and the camera body.

9. A camera body for a camera system, the camera body comprising:
   a front face of the camera body; and
   a lens mount to couple a lens housing having a camera lens positioned within the lens housing to the front face of the camera body,
   wherein the lens mount and the front face of the camera body are separable by a gap to insert a shim between the lens mount and the front face of the camera body to adjust the lens mount with respect to the camera body.

10. The camera body of claim 9, wherein the lens mount and the front face of the camera body are separable by the gap to insert the shim between the lens mount and the front face of the camera body to adjust the lens mount with respect to the front face of the camera body without fully removing the lens mount from the front face of the camera body.

11. The camera body of claim 9, wherein the lens mount and the front face of the camera body are separable by the gap to insert the shim between the lens mount and the front face of the camera body to adjust a depth, pitch, and yaw of the camera lens with respect to an imaging plane within the camera body.

12. The camera body of claim 9, further comprising a coupling mechanism to couple the lens mount to the camera body.

13. The camera body of claim 12, wherein the coupling mechanism comprises:
 a first fastener, located in a top hole of a top portion of the coupling mechanism, to couple the coupling mechanism to the front face of the camera body; and
 a second fastener, located in a bottom hole of a bottom portion of the coupling mechanism, to couple the coupling mechanism to the lens mount.

14. The camera body of claim 13, wherein the second fastener is partially loosened to create the gap without fully disengaging the lens mount from the front face of the camera body.

15. The camera body of claim 13, wherein the second fastener is configured to receive the shim as the shim is slid from the top portion of the coupling mechanism towards the bottom portion of the coupling mechanism portion.

16. A camera system, comprising:
 a lens housing having a distal end and a camera lens positioned within the lens housing;
 a camera body having a front face and an imaging plane within the front face of the camera body;
 a lens mount to couple the lens housing to the front face of the front face of the camera body,
 wherein the lens mount and the front face of the camera body are separable by a gap to insert a shim between the lens mount and the front face of the camera body to adjust the distal end of the lens housing with respect to the front face of the camera body.

17. The camera system of claim 16, wherein the lens mount and the front face of the camera body are separable by the gap to insert the shim between the lens mount and the front face of the camera body to adjust a depth, pitch, and yaw of the camera lens with respect to the imaging plane.

18. The camera system of claim 16, further comprising a coupling mechanism to couple the lens mount to the front face of the camera body.

19. The camera system of claim 18, wherein the coupling mechanism comprises:
 a first fastener, located in a top hole of a top portion of the coupling mechanism, to couple the coupling mechanism to the front face of the camera body; and
 a second fastener, located in a bottom hole of a bottom portion of the coupling mechanism, to couple the coupling mechanism to the lens mount.

20. The camera system of claim 19, wherein the second fastener is configured to receive the shim as the shim is slid from the top portion of the coupling mechanism towards the bottom portion of the coupling mechanism portion.

* * * * *